United States Patent [19]
Geerts

[11] Patent Number: 5,540,960
[45] Date of Patent: Jul. 30, 1996

[54] FIELD OF NATURAL AND ARTIFICIAL GRASS FIBERS

[75] Inventor: Jan F. M. Geerts, Leest-Mechelen, Belgium

[73] Assignee: Tapijtfabriek H. Desseaux N.V., Netherlands

[21] Appl. No.: 983,564

[22] PCT Filed: Oct. 15, 1991

[86] PCT No.: PCT/NL91/00202

§ 371 Date: Feb. 8, 1993

§ 102(e) Date: Feb. 8, 1993

[87] PCT Pub. No.: WO92/07142

PCT Pub. Date: Apr. 30, 1992

[30] Foreign Application Priority Data

Oct. 16, 1990 [NL] Netherlands ............................ 9002244

[51] Int. Cl.⁶ .................................................. E01C 13/00
[52] U.S. Cl. ................................................ 428/17; 156/61
[58] Field of Search ......................... 428/15–17; 156/61; 273/DIG. 13

[56] References Cited

U.S. PATENT DOCUMENTS

| | | | |
|---|---|---|---|
| 3,155,058 | 11/1964 | Valdi | 111/104 |
| 3,232,255 | 2/1966 | Mitchell | 111/130 |
| 3,802,790 | 4/1974 | Blackburn | 428/178 X |
| 3,937,158 | 2/1976 | Spanel | 112/80.07 |
| 4,337,283 | 6/1982 | Haas, Jr. | 428/17 |
| 4,396,653 | 8/1983 | Tomarin | 428/17 |
| 4,570,559 | 2/1986 | Buteux et al. | 428/15 X |

FOREIGN PATENT DOCUMENTS

| | | |
|---|---|---|
| 0174755 | 3/1986 | European Pat. Off. .............. 428/17 |
| 0260769 | 3/1988 | European Pat. Off. . |
| 0263566 | 4/1988 | European Pat. Off. .............. 428/17 |
| 0403008 | 12/1990 | European Pat. Off. .............. 428/17 |
| 2548231 | 1/1985 | France . |
| 2522864 | 12/1976 | Germany . |

*Primary Examiner*—Henry F. Epstein
*Attorney, Agent, or Firm*—Cushman Darby & Cushman, L.L.P.

[57] ABSTRACT

The invention relates to a field containing artificial grass consisting of a substructure and a top layer provided thereon, wherein the top layer is a nutrient medium (50) which contains regularly spaced fibers (1) which, when seen in the longitudinal direction of the fiber, extend further into the ground than above the ground, with natural grass (2) seeded between the fibers in a nutrient medium (5) on the substructure (3). The invention also relates to artificial fibers to be used with a field containing artificial grass wherein the fibers have a length of 20 60 cm. The invention further relates to a device for inserting artificial fibers into the ground, said device consisting of one or more planting pins (25), which are disposed perpendicularly to a frame (40), one or more tubes (20) being placed in a sliding frame (41) for supplying the fibers (30) to a location under the planting pin (25).

17 Claims, 3 Drawing Sheets

FIELD OF NATURAL AND ARTIFICIAL GRASS FIBERS

FIELD OF THE INVENTION

The invention relates to a field containing artificial grass consisting of a substructure and a top layer provided thereon.

BACKGROUND OF THE INVENTION

From European Patent Specification No. 263,566 a field of artificial grass is known which is in particular intended for soccer, whereby measures have been taken to make those fields of artificial grass, which so far have been used for playing hockey thereon, suitable for playing soccer thereon as well. These measures consist of frizzing the fibrous material and applying a substance on said fibrous material, as a result of which the coefficient of friction of the fibrous material is reduced. The field of artificial grass such as described in European Patent Specification 263.566 constitutes a considerable improvement compared to the known fields of artificial grass known at that time, but thanks to further developments it has been found possible to develop a field of artificial grass which more adequately satisfies the demands to be made of fields of artificial grass, in order to be able to practice a certain sport, such as soccer, thereon.

European Patent Specification No. 260,769 teaches that the substructure is important for a field of artificial grass, in particular for those sports whereby jumps are made on the field of artificial grass. So far the influence of such a substructure has been greater with fields of artificial grass on which soccer was played than with fields of artificial grass on which hockey was played. The field of artificial grass according to the invention proposed herein is less dependent on the substructure, at least less dependent on the specific measures such as described in European Patent Specification No. 260,769.

From European Patent Application No. 174,755 a method is known for providing a field containing artificial grass on a footway or on a sports field, by laying a layer with an open structure provided with artificial grass fibres and providing a particulate material, such as sand or ground particles, between said fibres. If such a mat is laid on ground in which natural grass can be made to grow, by providing natural grass seeds in said mat, the grass can be made to grow through the mat in which the artificial grass is incorporated. Thus a combination of artificial grass and natural grass is obtained.

From German Offenlegungsschrift No. 2,522,864 a method is known for protecting plants and the like, such as also natural grass on so-called grid stones, by providing artificial grass fibres around said grid stones or structural elements. Such grid stones are unsuitable for laying fields of artificial grass, however.

A field containing artificial grass comparable with the construction such as described in European Patent Application No. 174,755 is also mentioned in European Patent Application No. 403,008 (published on Dec. 19, 1990), which describes a sports field on a mat of artificial grass, rooted through with roots of grass plants penetrating the mat of artificial grass. Tests which have been taken, however, show that the growth of the natural grass is strongly impeded by the mat in which the artificial grass is provided, in spite of the fact that openings are provided all over the surface of the mat of artificial grass, as a result of which the grass plants grow from the foundation (see column 1, lines 46–49 of said European Patent Application No. 403.008).

SUMMARY OF THE PRESENT INVENTION

The field containing artificial grass according to the invention provides a solution for the above-described problems, so that a combination of natural grass and artificial grass in a field is obtained, whereby the artificial grass provides protection for the natural grass, whilst the growth of the natural grass is not impeded. Consequently the field containing artificial grass according to the invention is characterized in that the top layer is a nutrient medium which contains regularly spaced fibres which, when seen in the longitudinal direction of the fibre, extend further into the ground than above the ground, with natural grass seeded between the fibres in a nutrient medium on the substructure.

The field containing artificial grass according to the invention on the one hand consists of natural grass and on the other hand of fibres which have been provided in the field at regularly spaced intervals, whereby the part of the fibre projecting above the ground functions to protect the grass plant and in particular to protect the growing point of the grass plant. The growing point is located at the point where the grass emerges from the mat, which for the field containing artificial grass according to the invention is the nutrient medium.

Running movements and especially slidings may cause damage to the natural grass, in particular near the growing point, as a result of which the growth of the grass is hampered. With the field containing artificial grass according to the invention the growing point is covered by the fibre, thus preventing said growing point from being damaged. Furthermore the entire body of fibres makes the sward more stable, as a result of which no sliding away takes place and the load caused by a movement on the field is distributed over the grass and the fibres. After the sliding has been completed the fibrous material will become upright again and the growing point returns to its position prior to the sliding. On the basis of this assumption, although the invention is by no means limited by certain theoretical considerations, the length and the shape of the projecting fibre part only needs to be such that the growing point of the grass is covered upon collapse of the fibre.

Furthermore the dimensions of the fibre must be such that the area where the growing point is present is sufficiently covered. Any fibres that project too far above the ground may extend beyond the natural grass, constituting the drawback that a player's falling or sliding movements may lead to injuries, as is the case with known fields of artificial grass, viz. skin burns and grazing caused by the material of which the artificial grass is made. This problem has been reduced by the fields of artificial grass according to European Patent No. 263.566, but the field of artificial grass such as described in said European Patent still does not meet all the requirements which may be made within this scope and will not equal the properties of natural grass, therefore.

With the field containing artificial grass according to the invention it is achieved that said field can be played on much more intensively than a field of natural grass and that it does not have certain drawbacks of the fields containing artificial grass known so far. Fields of natural grass can be played on for an average of 250 hours per year, a field of artificial grass such as known from European Patent No. 263,566 for about 2000 hours and the field containing artificial grass according to the invention for 1200–1500 hours. From this it appears that as a result of the insertion of the fibres according to the invention the use of the field of natural grass may be intensified by a factor of 5–6.

The fibres which are regularly provided in the field of artificial grass according to the invention preferably have a length of 15–25 cm, penetrate at least 15–25 cm into the ground and project along 5–10% of their length above the ground. The length of the fibre is such that the part projecting from the nutrient medium is held in place and is not moved as a result of a sliding movement on the ground. The fibre extending through the nutrient medium furthermore functions to fix the roots of the grass thereto, which provides an additional reinforcement for both the grass, the fibres and the ground. For this purpose the fibre is put into the ground having the shape of a V, so that prior to being put into the ground a piece of fibre has a length of 20–60 cm and is provided with branches or is twisted so as to achieve a better anchoring to the ground and/or to the grass roots.

The invention also relates to a device for planting the artificial grass fibres in the ground. The planting in the ground of the artificial grass fibres is necessary according to the invention, in contrast to the non-prepublished European Patent Application No. 403,008, wherein use is made of a mat of artificial grass.

BRIEF DESCRIPTION OF THE DRAWINGS

The invention will be explained in more detail hereafter by means of the following description, wherein reference is made to the appended drawings, in which.

DETAILED DESCRIPTION

Figure 1:
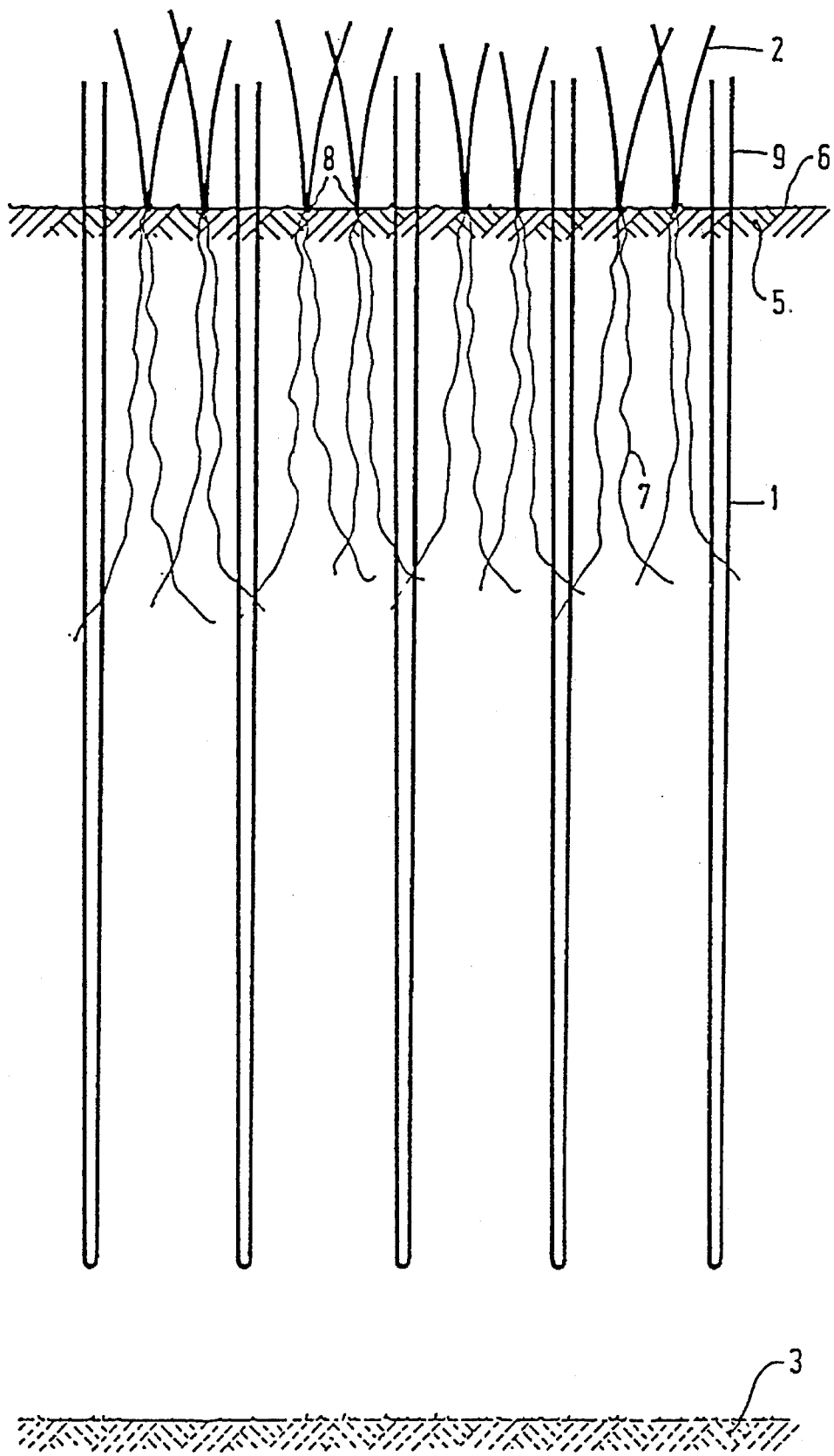
FIG. 1 diagrammatically illustrates the construction of a field containing artificial grass according to the invention.

In FIG. 1 the substructure 3 and the nutrient medium 5 are superimposed. The fibres 1 are passed through the nutrient medium, whereby the part 9 of fibres 1 projects above the nutrient medium 5. The top layer has been seeded with natural grass, whose blades 2 project from the nutrient medium, whilst the roots 7 are present in the nutrient medium, the growing points 8 are present at ground level 6.

Although there are no specific limitations as regards the substructure 3 and the nutrient 5, in order to achieve an optimal growth of the grass plants it will be preferred to dig away the terrain where the field of grass with fibres (to be called field containing artificial grass hereafter) is to be provided to approximately 50 cm under the future ground level, viz. level 6. Then the dug area is filled with foundation sand to a level of about 35–20 cm, in which foundation sand drainage may be provided. On the foundation sand, at level 3, about 15–30 cm of nutrient medium is provided. The nutrient medium preferably consists of a slightly humous sand, suitable for growing grass therein. The composition as regards grain size of the sand is such that an adequate perviousness to water is obtained and the the surface at level 6 is flat.

Figure 3:
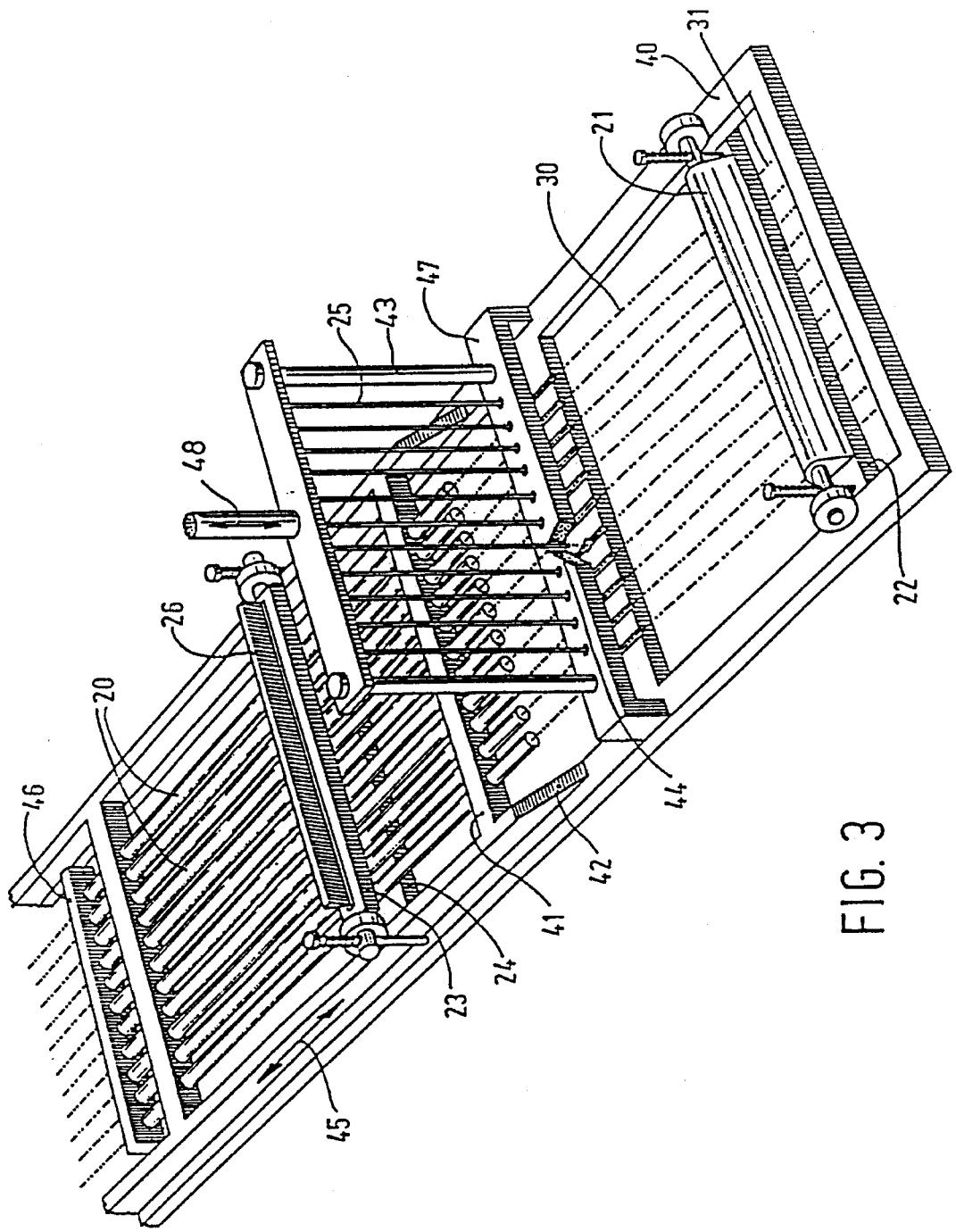
FIG. 3 shows a perspective view of the device according to the invention for planting artificial grass fibres.

After having prepared the substructure 3 and the nutrient medium 5 the fibres 1 are mechanically inserted, which fibres are e.g. inserted into the ground to a depth of 20 cm. For this purpose it will be possible to use a device as illustrated in FIG. 3, which will be explained in more detail hereafter. The fibres project about 1–1.5 cm above the surface and will have the shape of a loop or of a V as soon as they have been provided in the ground. In that case the length of a fibrous piece of artificial grass before it is put into the ground will be about twice the insertion depth. After the insertion of the fibres into the ground the nutrient medium will be seeded. It is also possible to seed the nutrient medium first and then insert the fibres 1 into the ground. Preferably the insertion of the fibres 1 into the ground is done mechanically, whereby it is especially preferred to have the insertion of the fibres and seeding take place simultaneously.

The fibrous material may be selected from the fibrous materials used so far for laying fields of artificial grass, preferably the fibres will be green, so that they are as inconspicuous as possible among the natural grass. A different colour may be chosen for those places in the field where a pattern of lines is to be provided. The material of which the fibres 1 are made may also be another material than that which has been used so far for artificial grass, however, such as a natural or other material, provided the mechanical strength of the fibres used is sufficient. Preferably a material is used whose coefficient of friction is comparable to that of natural grass. With regard to the shape of the fibres it is necessary that the projecting part 9 of the fibre is able to cover the growing point 8. Furthermore it may be desirable for the fibres to have branches or be twisted along their length, so that an adequate anchoring to the roots 7 of the grass on the one hand and to the sand on the other hand is obtained, so that the ground is more stable than of the known fields with artificial grass.

The length along which the fibre 1 projects above the surface 6, viz. 1–1.5 cm, has been selected to be less than the length at which the natural grass is mown. When the grass is being mowed the projecting fibre parts 9 do not form an impediment, therefore.

Furthermore it is preferred for the fibres 1 to be inserted into the nutrient medium at regularly spaced intervals. Such regular spacing may be achieved by providing the fibres in a certain pattern, such as in the corner points of an imaginary equilateral triangle. The dimension of the sides of said equilateral triangle may vary from a preferred 1 cm to 3 cm, whereby in the case of the larger dimension of said side fewer fibres per square meter of field are inserted in the ground. The more fibres that are provided in the ground, the better the growing points are protected and the more intensive such a field of artificial grass can be used. This also means that in those places of a field, e.g. a soccer field, where a great part of the game takes place, such as in the goal area, more fibres per square meter may be provided, so that in those places the side of the equilateral triangle is e.g. 10 mm and in those places where much less of the game is played the spacing between the fibres may be larger, e.g. 30 mm.

Figure 2:
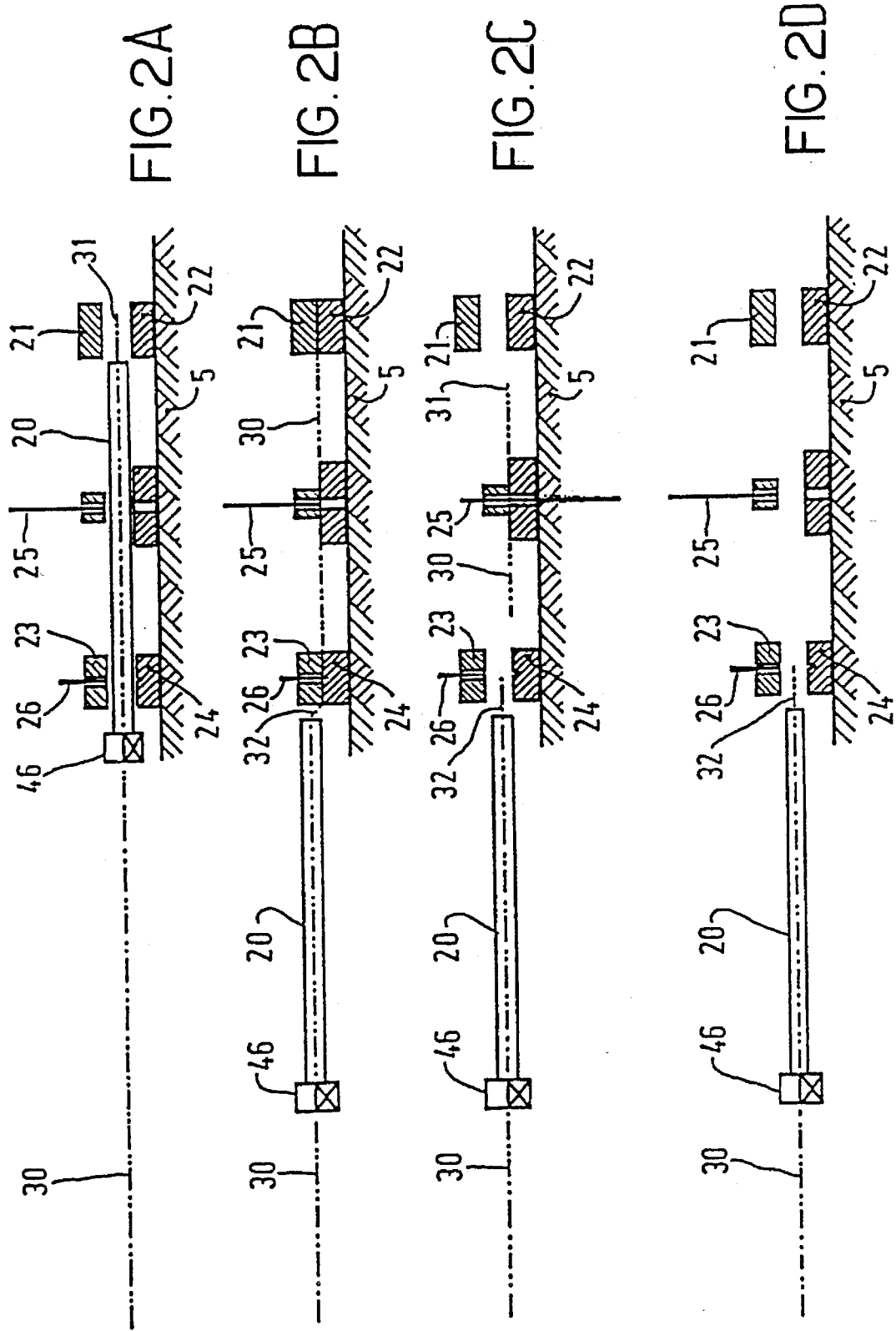
FIGS. 2A–2D diagrammatically illustrate the operation of the device according to the invention for planting artificial grass fibres in the ground.

In order to insert the fibres 1 into the nutrient medium in an efficient manner, a fibre planting machine such as illustrated in FIG. 3 has been developed. Before describing the device shown in FIG. 3 in more detail, reference is first made to FIG. 2, which diagrammatically indicates the operation of the fibre planting machine according to the invention. In FIG. 2 step A shows the first situation of the device as illustrated in FIG. 3, so as to provide the end 31 of the fibre 30 between the clamping blocks 21–22. In situation B the tube 20 is retracted from the clamping blocks whilst leaving the fibre 30 behind, the clamping blocks 21 and 23 being provided on the lower clamping blocks 22 and 24 respectively, so that the fibre 30 is fixed between the clamping blocks at its ends. The projecting end of the fibre indicated at 31 in situation A is clamped between the clamping blocks 21 and 22. In situation B the knife 26 is furthermore moved upwards, so that the fibre 30 is cut through and the end 32 can be released after the clamping blocks 23 and 24 have been separated. Furthermore the planting pin 25 is moved downwards, so that it will rest on the fibre 30.

According to situation C the fibre 30 is moved downwards under the influence of the planting pin 25, because the clamping blocks 21 and 23 are moved upwards as soon as the planting pin 25 comes into contact with the fibre 30, so that the fibre 30 is released from the clamping blocks at its ends 31 and 32 and is pressed into the ground, in particular into the nutrient medium 5, under the influence of the planting pin 25. In situation D the device is ready for the next cycle again. As soon as the planting pin 25 has been returned to its highest position, the tube 20 may be moved forward, so that the fibre end 32 is placed between the clamping blocks 21 and 22 and subsequently becomes the end 31, as is indicated in situation A.

After the explanation of the principle of the operation of the fibre planting machine, the machine itself will be explained in more detail by means of the description below, wherein reference is made to FIG. 3, wherein parts that correspond with parts in FIG. 2 have been given the same reference numbers as in FIG. 2.

FIG. 3 illustrates the fibre planting machine, whereby the tubes 20 are in a situation between A and B of FIG. 2 because the tubes 20 are making a retracting movement, since the fibres 30 are clamped between the clamping blocks 21 and 22. The fibres 30 present in the tubes 20, which are partially detached from the clamping blocks 21–22, are arranged within a frame 40, on which a sliding-frame 41 is mounted, which frame 41 can move as a whole in the directions such as indicated by the double arrow 45. The front end of the frame 41 is provided with a sloping end 42 which, as soon as it comes into contact with the clamping blocks 21 and 22, will move the clamping blocks 21 upwards, so that the tubes 20 can take care of it that the end 31 of the fibre 30 will come to lie between the clamping blocks 21 and 22. The ends of the tubes 20 are brought together in the tube holder 46. The guide 43 for the aggregate planting pins 25 extends perpendicularly to the frame 40. Guide 43 can be moved up and down as indicated by the double arrow 48. In the supporting beam 47 the guide 44 adjacent one planting pins is shown in a cut-away view. It will be apparent that the pin guides must be placed accurately with respect to the fibres 30, because the fibres 30 must be taken along when the planting pins 25 move downwards. The clamping block 23 is shown to contain the knife 26. The drawing furthermore shows a few adjusting means near the clamping blocks 21 and 23, although those adjusting means will not be described in more detail. Furthermore, it will be apparent that although the planting pins 25 are placed in one row in the beam 47, it is also possible to provide the planting pins 25 in a mutually staggered relation in the beam 47, so that it is possible to obtain a certain desired pattern of the fibres 30 inserted into the nutrient medium 5. Furthermore, it is possible that several rows of guides 43 for planting pins are provided on the frame 40. The various movable parts on the frame 40 can be driven by means of a hydraulic motor and geared to each other.

With this fibre planting machine it is possible to provide fibres into the ground in an efficient manner.

The field according to the invention now used constitutes an ideal combination of the fields of artificial grass known so far and a field of natural grass and it will be apparent that such a field is not limited to playing soccer thereon. Also all other sports, such as hockey, tennis, handball and golf can be successfully played on such a field of natural grass and fibres.

I claim:

1. A field comprised of a ground medium supporting a growth of natural grass with natural grass blades extending upwardly beyond said ground medium and a plurality of individually implanted artificial grass fibers, each implanted artificial fiber having an exposed portion, lying adjacent natural grass blades, and an implanted portion lying within said ground medium.

2. A field as in claim 1, wherein said implanted portion extends into said ground medium a distance greater than the length of said exposed portion.

3. A field as in claim 2, wherein said exposed portion has a length less than the mown length of said natural grass blades.

4. A field as in claim 1, wherein the fibers are imbedded in a pattern.

5. A field as in claim 4, wherein said fibers are imbedded in a regularly spaced pattern.

6. A field as in claim 5, wherein said regularly spaced pattern is in the form of a strip for lining the field.

7. A field as in claim 5, wherein the fiber in said strip has a color different from the color of the fiber used in other portions of the field.

8. A field as in claim 1, wherein the exposed portion of said fibers comprises about 5–10% of the length of the fiber.

9. A field as in claim 8, wherein said fibers have a length ranging from about 30 cm about 60 cm.

10. A field as in claim 8, wherein said fibers have a length ranging from about 15 cm to about 25 cm.

11. A field according to claim 1, wherein the fibres are placed at the corner points of an imaginary equilateral triangle having sides of about 10–30 mm in length.

12. A field containing artificial grass according to claim 1, wherein the fibres are made of a synthetic artificial grass material.

13. A field according to claim 1, wherein the fibres are made of a natural or other material which is resistant to wear.

14. A field according to claim 1, wherein the density of the implanted fibres per unit of area is larger in those places where the field is used more intensively.

15. A field according to claim 1, wherein the ground medium includes a 15–30 cm thick nutrient layer.

16. A field according to claim 1, wherein the implanted fibres are constructed in a way to enhance anchoring of them in the field.

17. A field according to claim 1, wherein the fibres have a V-shape after having been imbedded into the ground medium.

\* \* \* \* \*